US009541136B2

(12) United States Patent
Catalano

(10) Patent No.: US 9,541,136 B2
(45) Date of Patent: Jan. 10, 2017

(54) ROTATIVE ASSEMBLY, METHOD FOR DISMOUNTING A SEALING ELEMENT AND EXTRACTION TOOL FOR DISMOUNTING A SEALING ELEMENT

(71) Applicant: Denis Catalano, Nièvre (FR)

(72) Inventor: Denis Catalano, Nièvre (FR)

(73) Assignee: AKTIEBOLAGET SKF, Gothenburg (SE)

( * ) Notice: Subject to any disclaimer, the term of this patent is extended or adjusted under 35 U.S.C. 154(b) by 19 days.

(21) Appl. No.: 14/499,328

(22) Filed: Sep. 29, 2014

(65) Prior Publication Data

US 2015/0098669 A1 Apr. 9, 2015

(30) Foreign Application Priority Data

Sep. 27, 2013 (EP) ..................................... 13186495

(51) Int. Cl.
*F16J 15/32* (2016.01)
*F16C 33/78* (2006.01)
(Continued)

(52) U.S. Cl.
CPC ................ *F16C 33/78* (2013.01); *B23P 19/04* (2013.01); *B25B 27/0028* (2013.01); *F16C 19/24* (2013.01); *F16C 33/783* (2013.01); *F16C 33/7803* (2013.01); *F16C 33/7856* (2013.01); *F16C 33/7886* (2013.01);
(Continued)

(58) Field of Classification Search
CPC .... B25B 27/0028; F16C 33/72; F16C 33/783; F16C 33/7889; F16C 19/24; F16C 19/381; F16C 33/7856; F16C 33/74; F16C 33/7803; F16C 43/045; F16J 15/32–15/3296; Y10T 29/49815; B23P 19/04

See application file for complete search history.

(56) References Cited

U.S. PATENT DOCUMENTS 3,113,813 A * 12/1963 Lobeck .................. F16C 19/26
384/481
4,813,120 A * 3/1989 Fournier ............. B25B 27/0028
29/235
(Continued)

FOREIGN PATENT DOCUMENTS

DE 102005041917 A1 * 3/2007
DE 102010053203 A1 * 6/2012
(Continued)

*Primary Examiner* — Alan B Waits
(74) *Attorney, Agent, or Firm* — Bryan Peckjian; SKF USA Inc. Patent Dept.

(57) ABSTRACT

This rotative assembly comprises a first element rotating with respect to a second element around a rotation axis, at least one bearing arranged between the first and second element, and at least one sealing element arranged between the first element and the second element. The sealing element is housed in a peripheral groove provided on the first element, and comprises at least one sealing lip resting on a surface of the second element. The first element comprises an extraction groove realized on a radial surface of the first element, and which forms an empty space below an internal surface of the sealing element and creates an axial access to said empty space from an axial end surface of the first element.

4 Claims, 4 Drawing Sheets

(51) Int. Cl.
*B25B 27/00* (2006.01)
*B23P 19/04* (2006.01)
*F16C 19/24* (2006.01)
*F16C 19/38* (2006.01)
*F16C 33/74* (2006.01)
*F16C 43/04* (2006.01)

(52) U.S. Cl.
CPC ......... *F16J 15/3268* (2013.01); *F16C 19/381* (2013.01); *F16C 33/74* (2013.01); *F16C 43/045* (2013.01); *Y10T 29/49815* (2015.01)

(56) References Cited

U.S. PATENT DOCUMENTS

| | | | | |
|---|---|---|---|---|
| 5,564,175 | A * | 10/1996 | Nejad | B25B 27/0028 29/235 |
| 5,579,718 | A * | 12/1996 | Freerks | F16K 51/02 118/733 |
| 5,683,186 | A * | 11/1997 | Akimoto | F16C 19/362 384/484 |
| 6,713,711 | B2 * | 3/2004 | Conway | B23K 9/323 219/121.48 |
| 6,979,131 | B1 * | 12/2005 | Lippert | F16C 19/28 384/551 |
| 9,188,107 | B2 * | 11/2015 | Minadeo | F03D 11/0008 |
| 2003/0092302 | A1 * | 5/2003 | Conway | B25B 27/0028 439/271 |
| 2013/0017089 | A1 * | 1/2013 | Stiesdal | F03D 11/0008 416/174 |
| 2015/0316152 | A1 * | 11/2015 | Fietz | F16C 33/783 277/566 |

FOREIGN PATENT DOCUMENTS

| | | | |
|---|---|---|---|
| JP | H0586030 | U * | 11/1993 |
| JP | 4140411 | B2 * | 8/2008 |
| JP | 4367635 | B2 * | 11/2009 |
| WO | WO2011050838 | A1 * | 5/2011 |
| WO | WO2012128103 | A1 * | 9/2012 |
| WO | WO2014180668 | A1 * | 11/2014 |

* cited by examiner

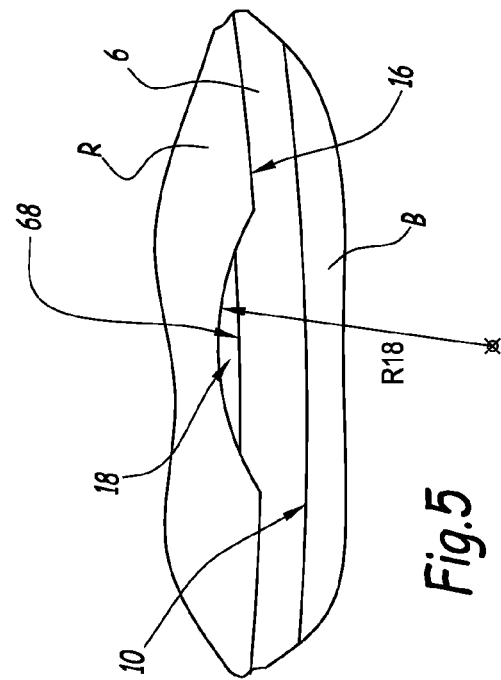
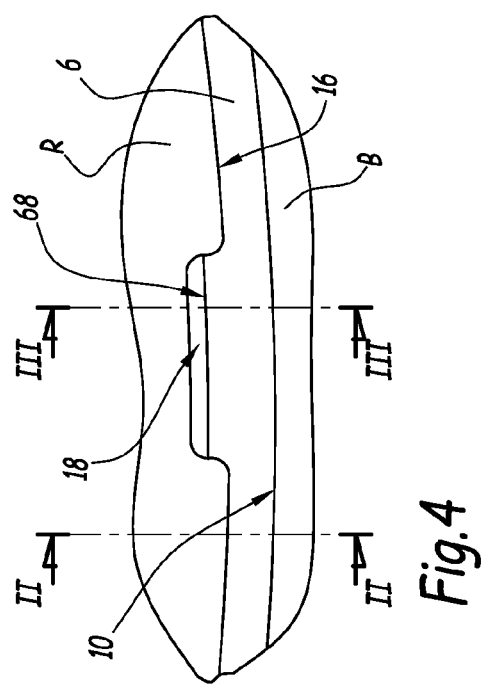

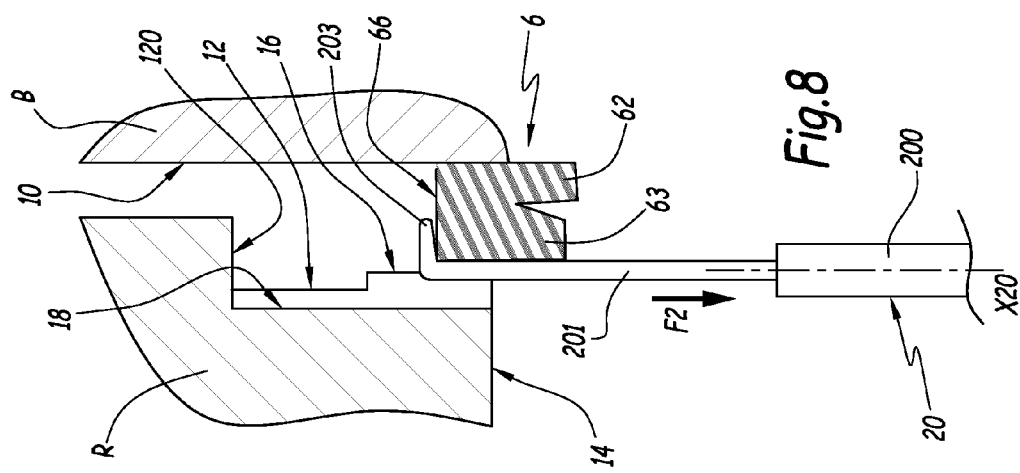
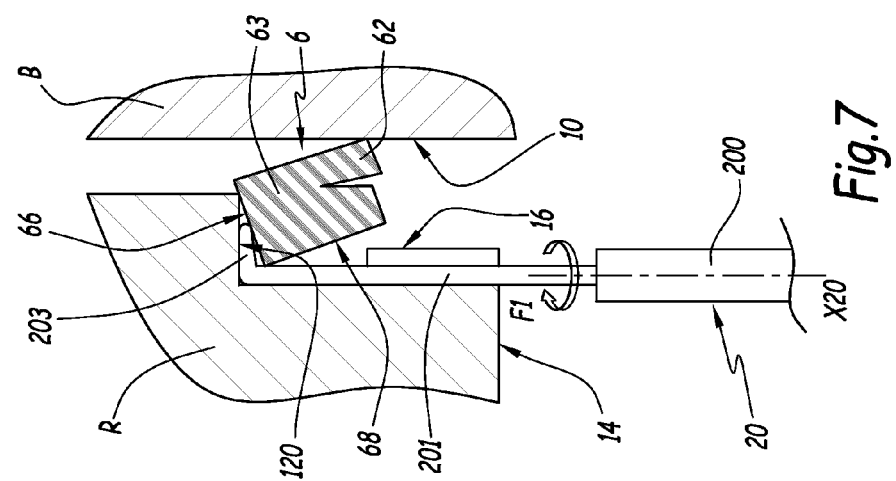
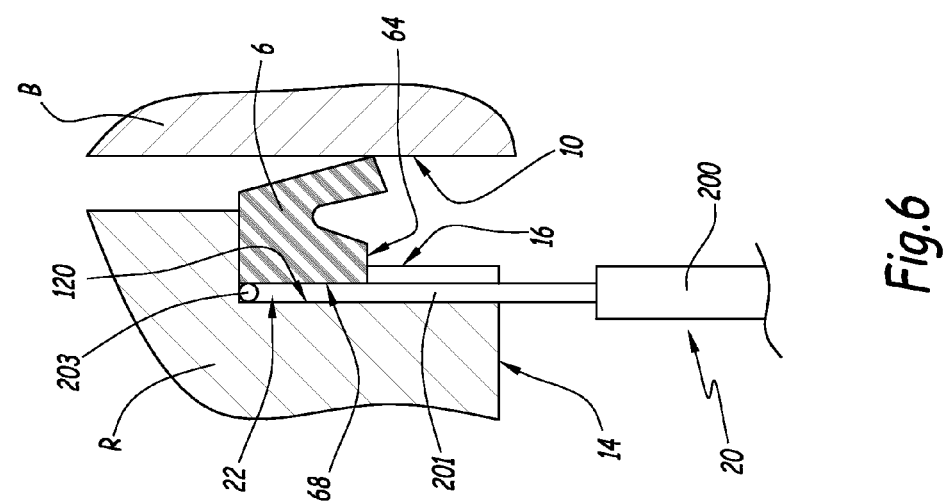

ROTATIVE ASSEMBLY, METHOD FOR DISMOUNTING A SEALING ELEMENT AND EXTRACTION TOOL FOR DISMOUNTING A SEALING ELEMENT

CROSS REFERENCE TO RELATED APPLICATION

This is a National Stage application claiming the benefit of European Union Patent Application Number 13186495.1 filed on 27 Sep. 2013 (27.09.2013), which is incorporated herein by reference in its entirety.

TECHNICAL FIELD

The invention relates to a rotative assembly, to a method for dismounting a sealing element of such a rotative assembly and to an extraction tool for implementing such a method.

BACKGROUND ART

Rotative assemblies are equipped with several dynamic sealing elements also named <<DUSE>> seals, which have to be replaced when they are worn off. In order to dismount such sealing elements, some components, such as rolling bearings, must often be dismounted so that the sealing elements can be extracted and replaced by new ones.

In tunnel boring machines, oil pumping installations or marine applications, some rotative assemblies cannot be dismounted without heavy operations and tooling.

The aim of the invention is to provide a new rotative assembly in which the sealing elements can be replaced without complex and lengthy operations.

To this end, the invention concerns a rotative assembly comprising a first element rotating with respect to a second element around a rotation axis, at least one bearing arranged between the first and second element, and at least one sealing element arranged between the first element and the second element, the sealing element being housed in a peripheral groove provided on the first element, the sealing element comprising at least one sealing lip resting on a surface of the second element. The rotative assembly is characterized in that the first element comprises an extraction groove realized on a radial surface of the first element, and which forms an empty space below an internal surface of the sealing element and creates an axial access to said empty space from an axial end surface of the first element.

Thanks to the invention, the sealing element can be dismounted and extracted from the rotative assembly without dismounting any of the other components of the rotative assembly, such as bearings. Consequently, replacement of sealing elements takes less time and fewer operations than for rotative assemblies of the prior art.

INVENTION SUMMARY

According to further aspects of the invention which are advantageous but not compulsory, such a rotative assembly may incorporate one or several of the following features:
- The extraction groove extends parallely to the rotation axis of the rotative assembly on an angular sector of the circumference of the first element.
- The extraction groove has a partly cylindrical shape.
- The extraction groove has a radius equal to the radius of a machining cutter used to realize the extraction groove.

The invention also concerns a method for dismounting a sealing element of a rotative assembly as mentioned hereabove, characterized in that it comprises steps consisting in:
 a) inserting a tool in the extraction groove so that a hook portion of the tool is comprised in the empty space extending between the sealing element and the extraction groove;
 b) lifting the sealing element from its housing by rotating the tool around its longitudinal axis and inserting the hook portion of the tool between a radial surface of the peripheral groove and a radial surface of the sealing element on a side opposed to the axial end surface of the first element;
 c) extracting the sealing element from the peripheral groove by pulling the tool along its longitudinal axis.

Advantageously, at step c), the sealing element is radially compressed between the surface of the second element on which the sealing lip lays and the radial surface of the first element on which the extraction groove is provided.

The invention also relates to an extraction tool for implementing the above-mentioned method, characterized in that it comprises a elongated rod, having one end adapted to be held by an operator, and a hook portion adapted to be inserted between the sealing element and the extraction groove.

According to further aspects of the invention which are advantageous but not compulsory, such an extraction tool may incorporate one or several of the following features:
- The hook portion is perpendicular to the elongated rod.
- The hook portion has a flat shape perpendicular to the longitudinal axis of the tool.

BRIEF DESCRIPTION OF THE DRAWINGS

The invention will now be explained in reference to the annexed figures, as an illustrative example. In the annexed figures:

FIG. 4 is a view along arrow IV on FIG. 2, of a rotative assembly according to a first embodiment of the invention;

FIG. 5 is a view similar to FIG. 4, of a rotative assembly according to a second embodiment of the invention;

FIG. 6 is a view similar to FIG. 3, an extraction tool according to the invention being inserted in an extraction groove of a rotatable element of the rotative assembly of FIG. 1;

FIG. 7 is a view similar to FIG. 6, the extraction tool of FIG. 6 being rotated around its longitudinal axis; and FIG. 8 is a view similar to FIGS. 6 and 7, a sealing element of the rotative assembly being extracted thanks to the extraction tool of FIGS. 6 and 7.

DETAILED DESCRIPTION

Figure 1:
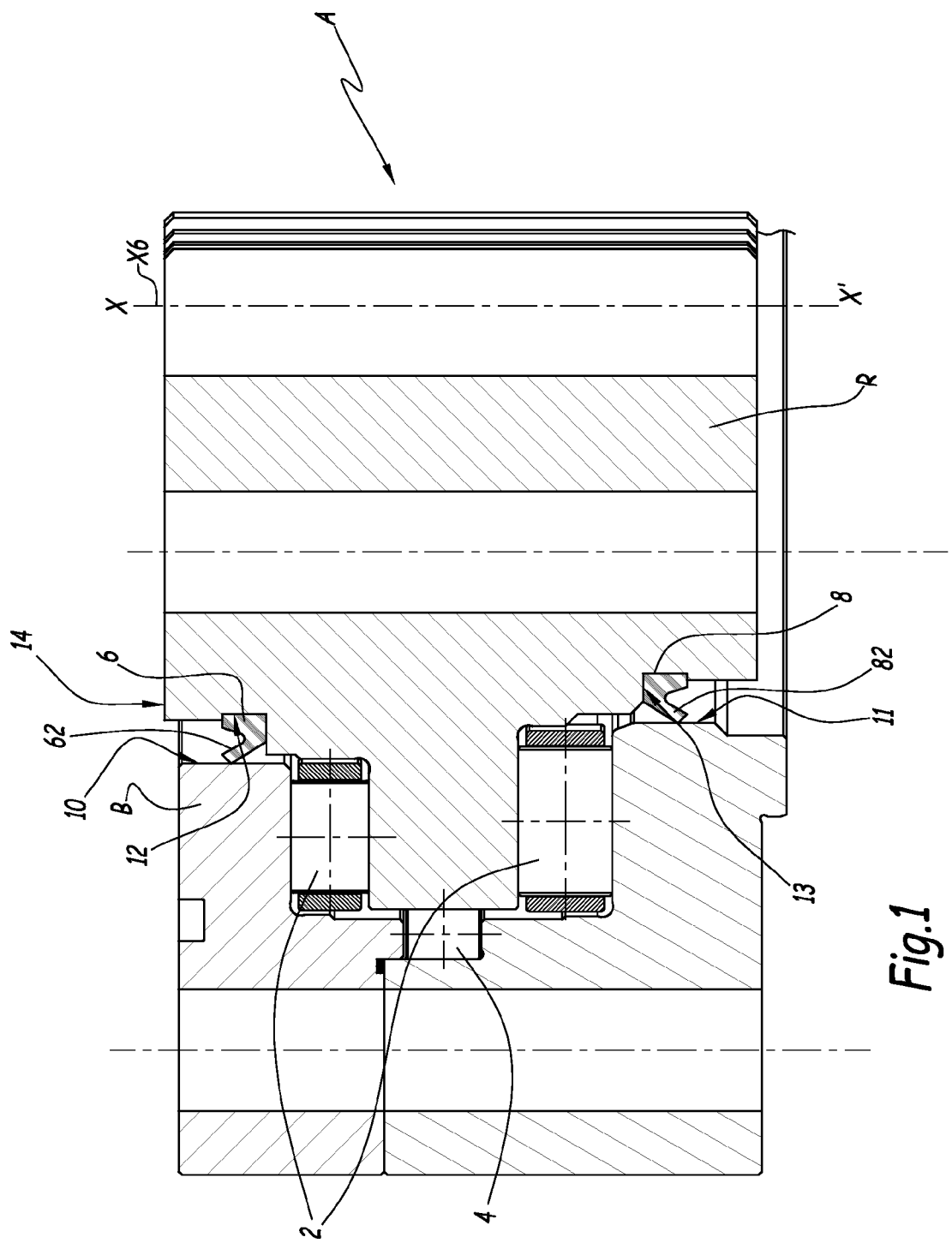
FIG. 1 is a sectional view of a rotative assembly according to the invention.

A rotative assembly A is represented on FIG. 1. Rotative assembly A comprises a rotatable element R and a non rotatable element B. Rotatable element R is adapted to rotate with respect to non rotatable element B around a rotation axis X-X'.

Rotative assembly A comprises bearing systems which permit the rotation of rotatable element R with respect to non rotatable element B. These bearing systems comprise two radial roller bearings 2, comprising rollers which have a rotation axis perpendicular to axis X-X', and one axial roller bearing 4, which comprises rollers which have a rotation axis parallel to axis X-X'.

According to a non-shown embodiment of the invention, rotative assembly A may comprise other types of bearing systems such as ball bearings, needle bearings or plain bearings.

For example, rotative assembly A may belong to a tunnel boring machine, an oil pumping installation or any other application in marine activities or not.

Rotative assembly A includes sealing elements 6 and 8 adapted to prevent lubrication oil, which facilitates rotation of rotatable element R with respect to non rotatable element B, from getting outside assembly A, and to prevent exterior elements, such as dust, metal particulates or sea water, from getting inside rotative assembly A and damaging its components. Sealing elements 6 and 8 are coupled in rotation with rotatable element R, and comprise respective sealing lips 62 and 82 which lay on respective radial surfaces 10 and 11 of non rotatable element B.

According to a non-shown embodiment of the invention, rotative assembly A may comprise only one sealing element 6 or 8.

Figure 3:
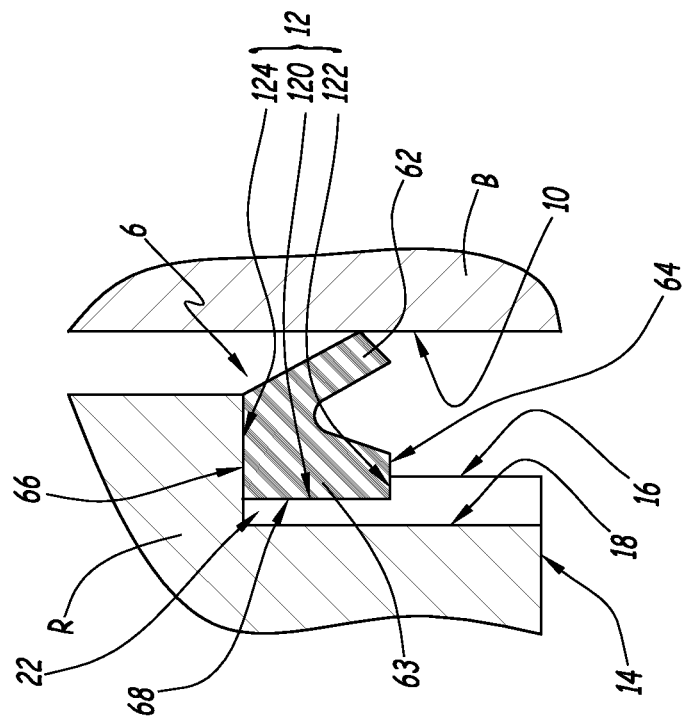
FIG. 3 is a sectional view along plane on FIG. 4, of a portion of the rotative assembly of FIG. 1.
Figure 2:
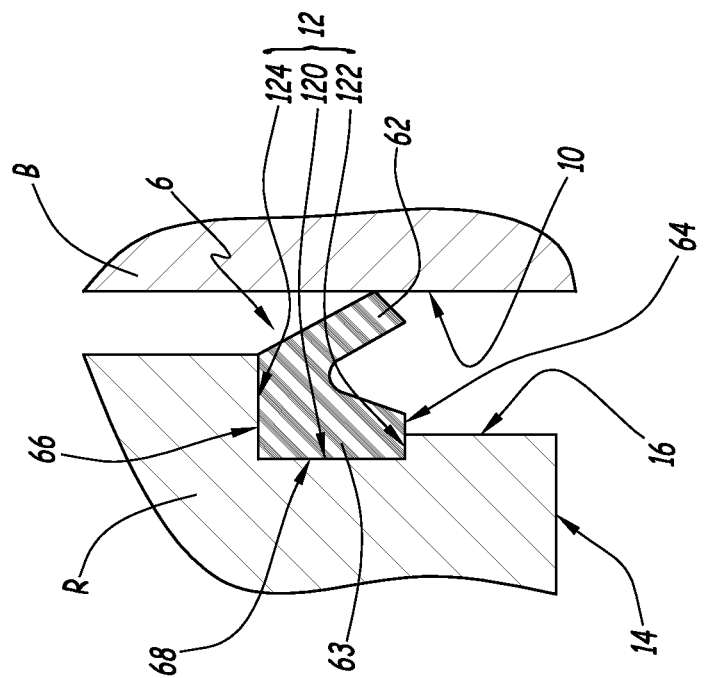
FIG. 2 is a sectional view, along plane II-II on FIG. 4, of a portion of the rotative assembly of FIG. 1.

Sealing elements 6 and 8 are housed in respective peripheral grooves 12 and 13 of rotatable element R. As shown in FIGS. 2 and 3, peripheral groove 12 defines a bottom 120 formed by a cylindrical surface parallel to axis X-X'. Rotatable element R comprises an axial end surface 14 which is perpendicular to axis X-X'. Peripheral groove 12 also defines a first annular surface 122 which is perpendicular to axis X-X' and which extends radially outwards with respect to bottom 120 on the side of axial surface 14. Between annular surface 122 and end surface 14, rotatable element R comprises a radial cylindrical surface 16. Peripheral groove 12 is axially delimited, on its side opposed to annular surface 122, by an annular surface 124 which is parallel to annular surface 122. The outer diameter of annular surface 124 is superior to the outer diameter of annular surface 122.

Sealing element 6 extends around a central axis X6, which corresponds to axis X-X' on FIG. 1. Along axis X6, sealing element 6 comprises a first terminal surface 64 which abuts against annular surface 122 in the mounted configuration of sealing element 6, and a terminal surface 66 which abuts against annular surface 124 in the mounted configuration of sealing element 6. Sealing element 6 comprises an internal cylindrical surface 68 which lies against bottom 120. Sealing lip 62 extends from an outer surface of sealing lip 6 located on the side of terminal surface 66 and is directed radially outwards on the side of terminal surface 64. Sealing lip 62 extends from a tubular portion 63 of sealing element 6 which bears surfaces 64, 66 and 68.

In case sealing element 6 is worn out, sealing element 6 must be dismounted and replaced. In order to dismount sealing element 6, rotatable element R comprises an extraction groove 18 which extends on cylindrical surface 16 parallel to axis X-X' from end surface 14 towards annular surface 124. Extraction groove 18 extends on an angular sector of the circumference of rotatable element R. The depth of extraction groove 18 is superior to the depth of peripheral groove 12 with respect to cylindrical surface 16. Extraction groove 18 provides an empty space 22 below internal surface 68, and provides an axial access from end surface 14 towards empty space 22 and sealing element 6.

The method for dismounting sealing element 6 from rotative assembly A comprises a first step consisting in inserting an extraction tool 20 in extraction groove 18. Extraction tool 20 comprises a handle 200 and an elongated rod 201, which defines a longitudinal axis X20, terminated by a hook portion 203. When extraction tool 20 is inserted in extraction groove 18 as represented on FIG. 6, hook portion 203 is completely comprised in the empty space 22 extending between internal surface 68 and bottom 120.

The extraction method comprises a second step consisting in rotating extraction tool 20 around longitudinal axis X20, as represented by arrow F1 so that hook portion 203 lifts sealing element 6 from bottom 120. Sealing element 6 must be lifted so that internal surface 68 is able to come out of peripheral groove 12. It is then possible to insert hook portion 203 between surfaces 66 and 120, on the side opposed to axial end surface 14, thanks to the shape of hook portion 203, which is perpendicular to elongated rod 201.

In a third step, sealing element 6 is extracted from rotative assembly A by pulling extraction tool 20 away from rotative assembly A along longitudinal axis X20, as shown by arrow F2. While pulling extraction tool 20 away from rotative assembly A, sealing element 6 is radially compressed so that sealing lip 62 is pushed against central tubular portion 63, in order to allow sealing element 6 to be extracted between cylindrical radial surface 16 and cylindrical radial surface 10 on the side of end surface 14.

Thanks to this extraction method, no component of rotative assembly A needs to be dismounted. The extraction operation and the subsequent sealing element replacement is therefore simpler and faster than in rotative assemblies of the prior art.

In order to facilitate the extraction of sealing element 6 or 8, the extraction tool 20 can be moved between the groove 12 and the sealing element 6 or 8 around the whole circumference of rotatable element R, so as to lift sealing element 6 or 8 from groove 12 around the whole circumference of groove 12.

Extraction groove 18 may have a substantially rectangular shape, as shown on FIG. 4.

According to an alternative embodiment represented on FIG. 5, extraction groove 18 may have a partly cylindrical shape, having a radius R18 equal to the radius of a machining cutter used to realize extraction groove 18.

According to a non-shown embodiment of the invention, hook portion 203 may be flat shaped perpendicularly to longitudinal axis X20, so that hook portion 203 can be easily inserted between sealing element 6 and extraction groove 18 on the side opposed to end surface 14.

According to another non-shown embodiment of the invention, at least one of the sealing elements 6 and 8 may be mounted in a groove of non-rotatable element B instead of rotatable element R.

The invention claimed is:
1. A rotative assembly comprising:
a first element mounted of rotation to a second element around a rotation axis, the first element being spaced from the second element by a radial gap, and the first element including a peripheral groove in the radial gap in a surface of the first element;
at least one bearing in the radial gap; and
a sealing element in the peripheral groove and extending into the radial gap, the sealing element including at least one sealing lip contacting a surface of the second element,
wherein the first element includes an extraction groove in the surface of the first element, the extraction groove extending from an axial end of the first element into the radial gap and into the peripheral groove, and an end of the extraction groove in the peripheral groove forming a space radial opposite the sealing element from the radial gap.

2. The rotative assembly according to claim 1, wherein the extraction groove is parallel to the rotation axis.

3. The rotative assembly according to claim 1, wherein the surface of the first element is parallel to the surface of the second element.

4. The rotative assembly according to claim 1, wherein the surface of the first element and the surface of the second element comprise coaxially disposed cylinders.

* * * * *